United States Patent
Togashi

(10) Patent No.: US 8,223,471 B2
(45) Date of Patent: Jul. 17, 2012

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 370 days.

(21) Appl. No.: 12/629,473

(22) Filed: Dec. 2, 2009

(65) Prior Publication Data

US 2010/0182732 A1    Jul. 22, 2010

(30) Foreign Application Priority Data

Jan. 20, 2009   (JP) ................................. 2009-009961

(51) Int. Cl.
*H01G 2/20* (2006.01)
*H01G 4/005* (2006.01)

(52) U.S. Cl. ..................................... 361/308.1; 361/303
(58) Field of Classification Search .................. 361/303, 361/306.1, 308.1, 309
See application file for complete search history.

(56) References Cited

U.S. PATENT DOCUMENTS

| | | | | |
|---|---|---|---|---|
| 4,158,218 A | * | 6/1979 | McLaurin et al. | 361/308.1 |
| 4,617,609 A | * | 10/1986 | Utner et al. | 361/310 |
| 6,477,030 B2 | * | 11/2002 | Hidaka et al. | 361/301.3 |
| 6,661,641 B2 | * | 12/2003 | Moriwaki et al. | 361/308.1 |
| 6,781,816 B2 | | 8/2004 | Togashi | |
| 6,885,538 B1 | * | 4/2005 | Ishii et al. | 361/301.3 |

FOREIGN PATENT DOCUMENTS

| | | |
|---|---|---|
| JP | U 2-8125 | 1/1990 |
| JP | U 2-60218 | 5/1990 |
| JP | 06053070 A  * | 2/1994 |
| JP | 06120069 A  * | 4/1994 |
| JP | A 6-302460 | 10/1994 |
| JP | A-2003-257784 | 9/2003 |
| JP | A-2004-266110 | 9/2004 |
| JP | A 2007-103497 | 4/2007 |

OTHER PUBLICATIONS

English-language translation of Office Action issued in JP 2009-009961, mailed Jan. 25, 2011.

* cited by examiner

*Primary Examiner* — Eric Thomas
(74) *Attorney, Agent, or Firm* — Oliff & Berridge, PLC

(57) ABSTRACT

A multilayer capacitor is provided which can efficiently prevent chattering noises from occurring in a simple structure. In the multilayer capacitor, a metal terminal is disposed about a capacitor element body. Even when an electrostrictive vibration is generated in the multilayer capacitor upon voltage application, a joint surface joining a substrate connecting surface and a terminal connecting surface together in the metal terminal can flex, so as to mitigate the electrostrictive vibration, thereby preventing chattering noises from occurring. In the multilayer capacitor, the terminal connecting surface and joint surface form a rising part having a height which is about half that of the capacitor element body. Therefore, the joint surface joins together the terminal connecting surface and substrate connecting surface that are positioned on different side faces of the capacitor element body, whereby a sufficient length can be secured in the joint surface, thus improving the efficiency of mitigating electrostrictive vibrations. Further, a simple procedure of just mounting the bottom face of the capacitor element body onto the front side of the capacitor element body supporting surface can easily attach the metal terminal to the capacitor element body.

6 Claims, 14 Drawing Sheets

Fig.3
(a)
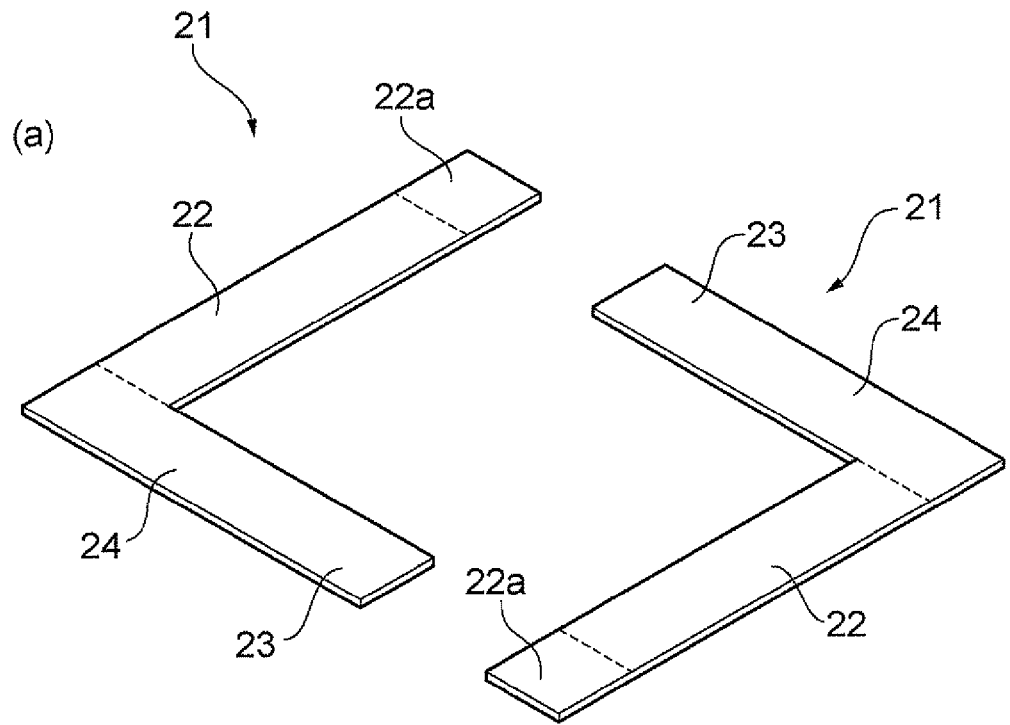
(b)
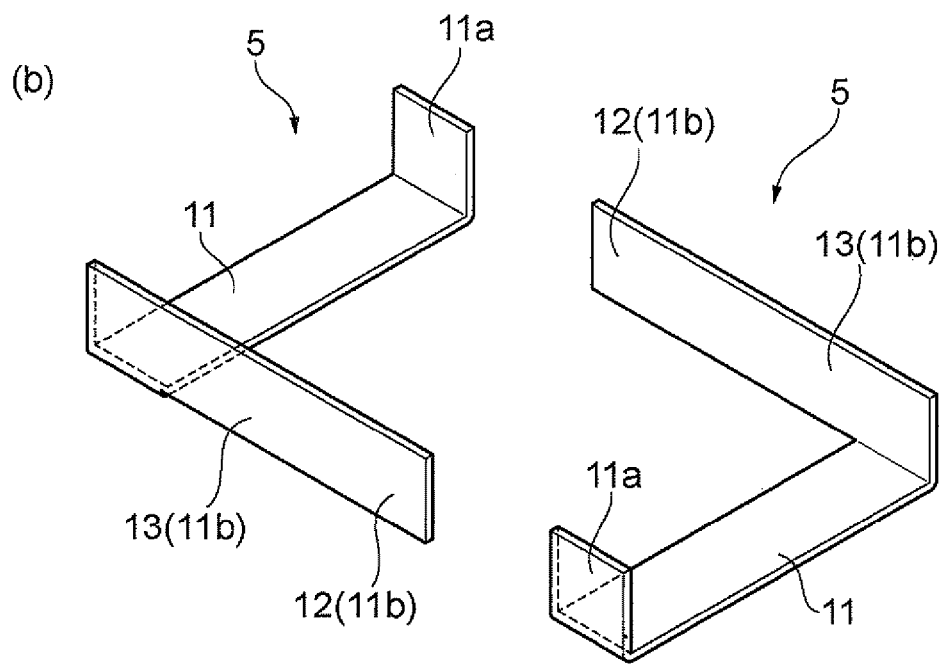

Fig.7
(a)
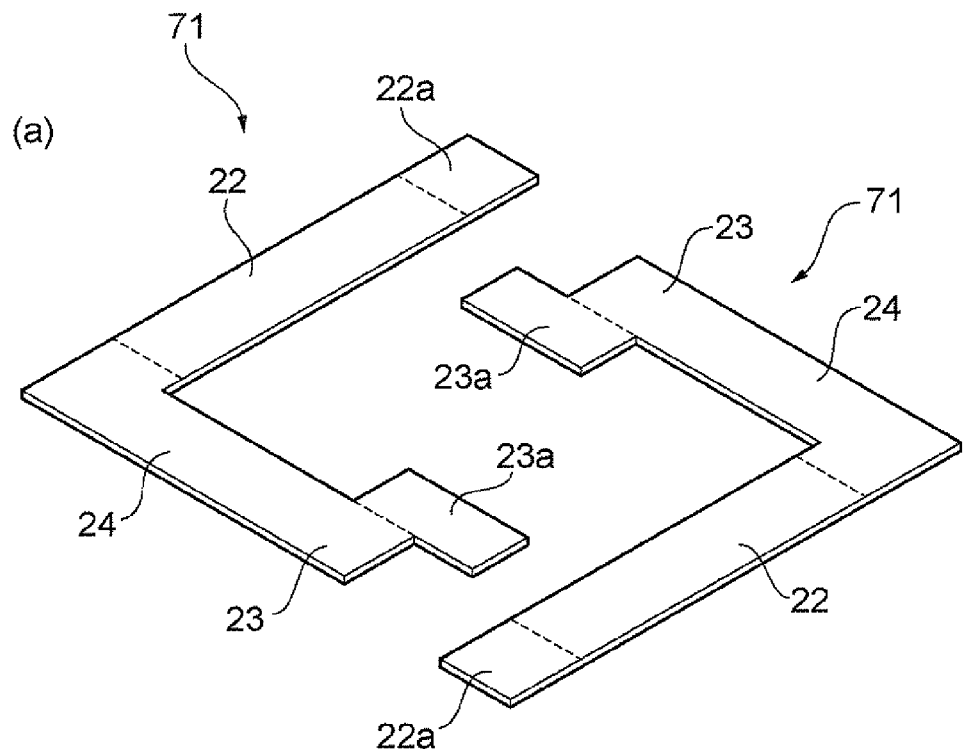
(b)
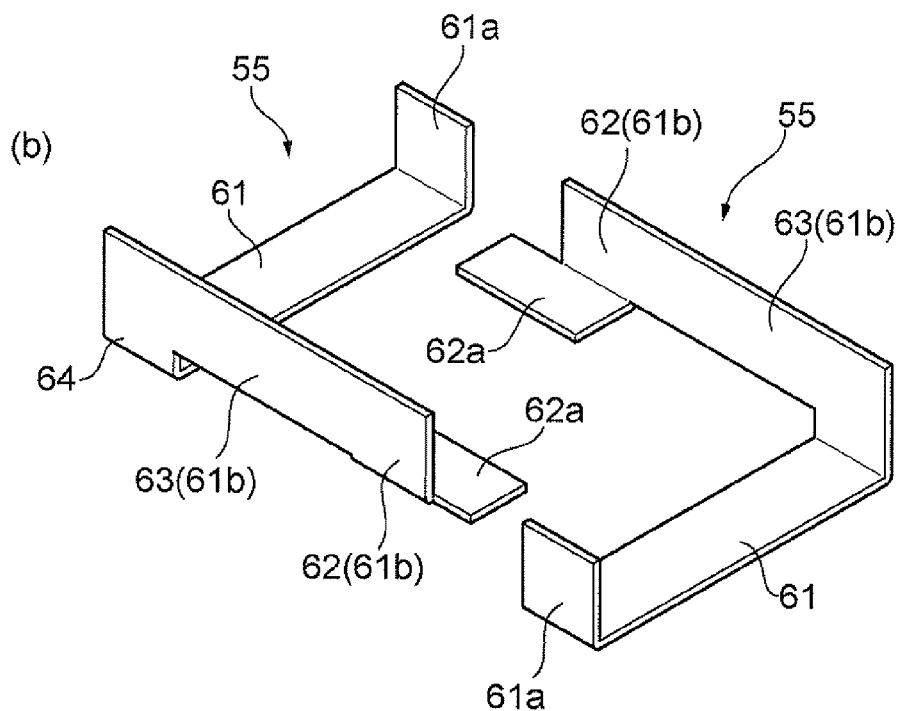

Fig.10
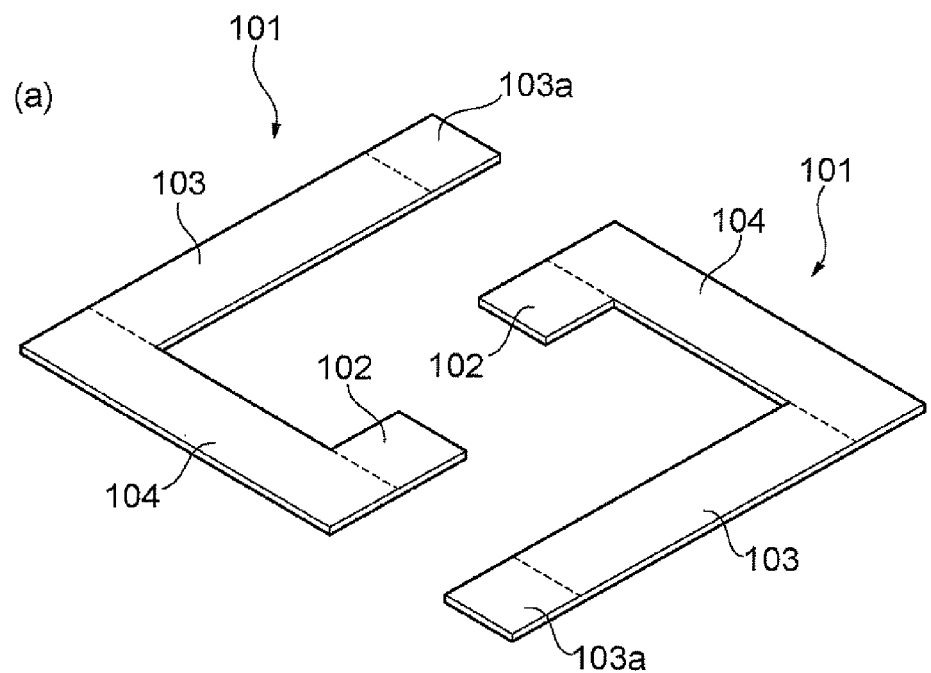
(a)
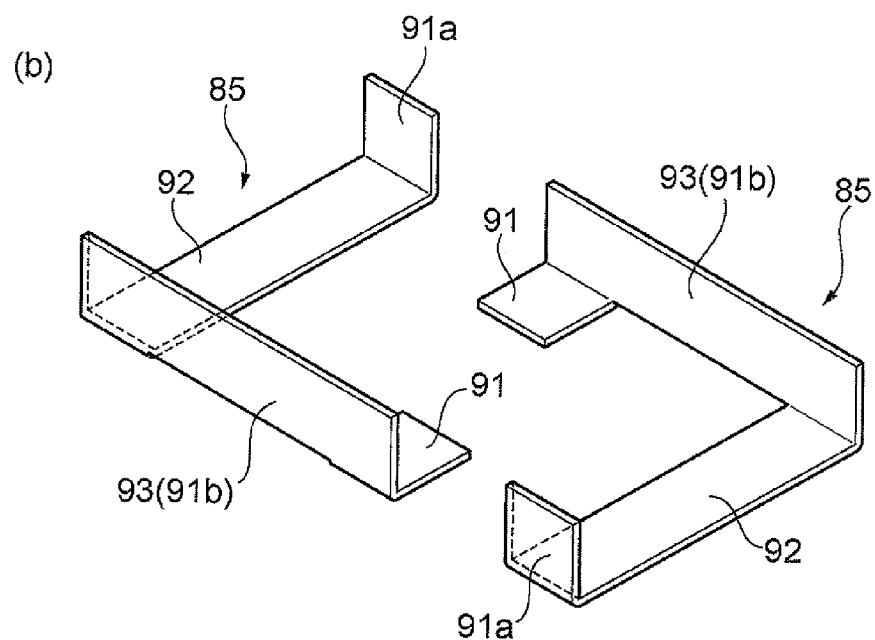
(b)

*Fig.12*
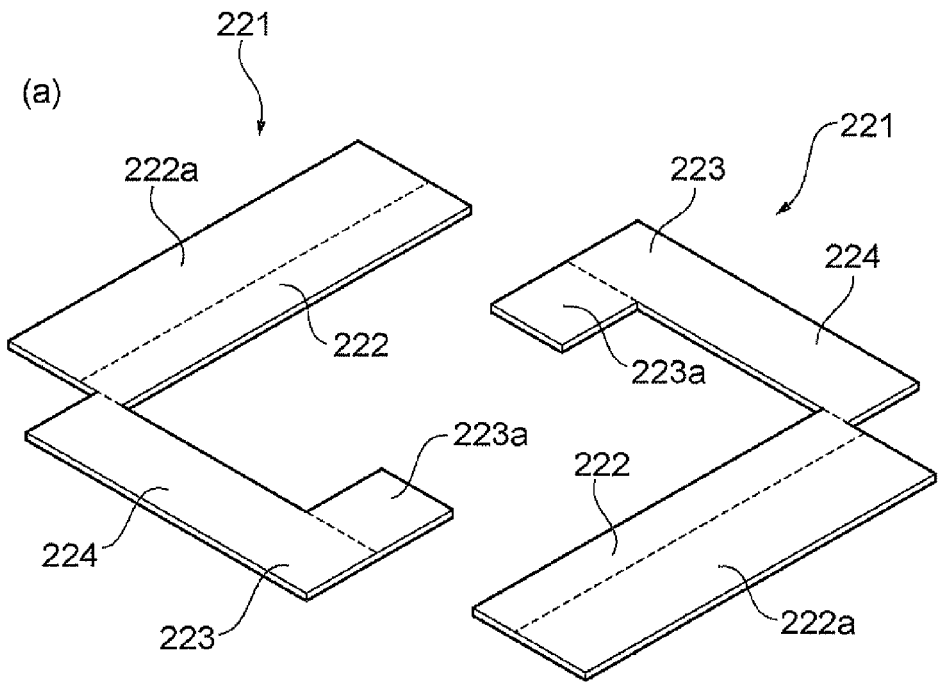
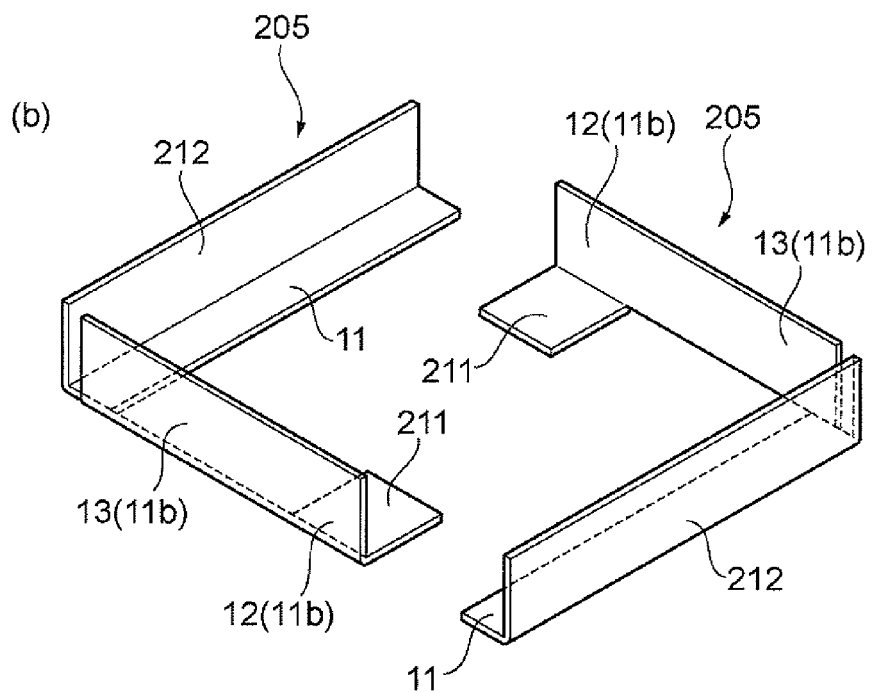

Fig.14
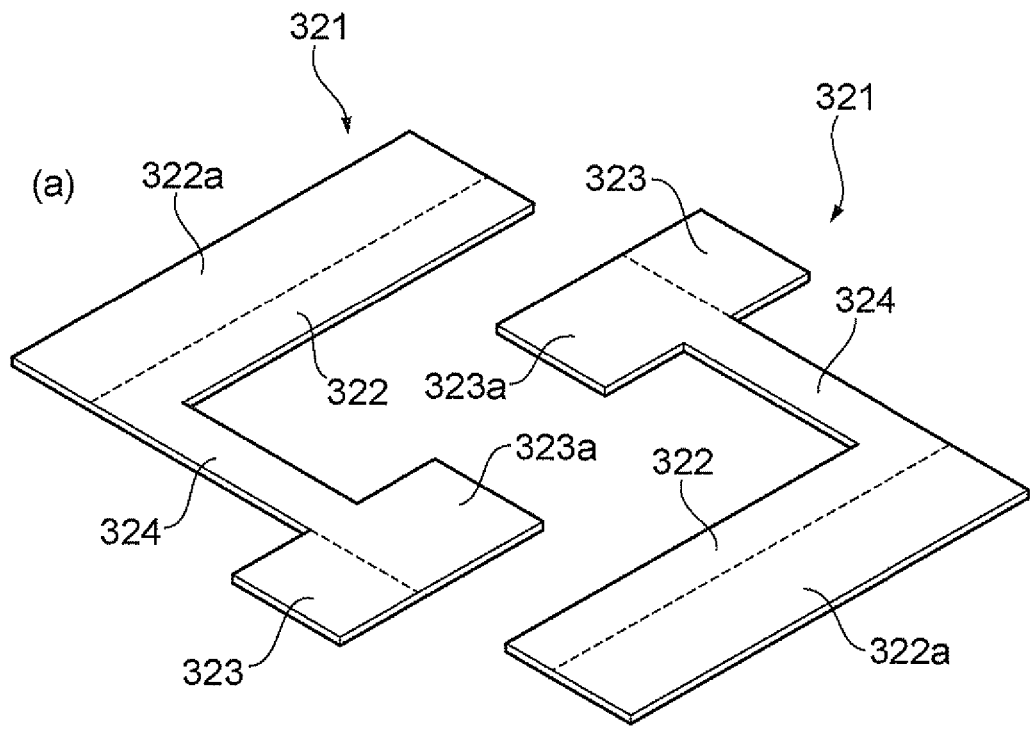
(a)
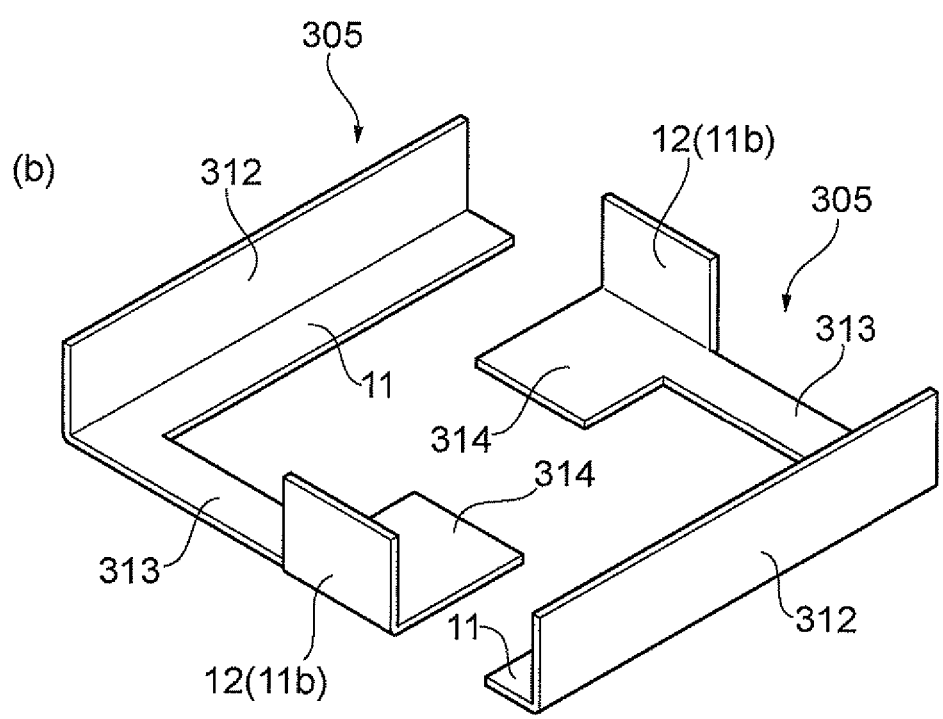
(b)

MULTILAYER CAPACITOR

BACKGROUND OF THE INVENTION

1. Field of the Invention

The present invention relates to a multilayer capacitor.

2. Related Background Art

A multilayer capacitor comprising a capacitor element body formed by laminating a plurality of dielectric layers, a plurality of inner electrodes formed within the capacitor element body, and a pair of terminal electrodes formed on side faces of the capacitor element body has conventionally been known. When a voltage is applied to the multilayer capacitor, a mechanical strain having a magnitude corresponding to the applied voltage is generated in the capacitor element body because of the electrostrictive effect. When an AC voltage is applied, the mechanical strain causes vibrations (electrostrictive vibrations) in the multilayer capacitor in particular. Therefore, when an AC voltage is applied to a multilayer capacitor mounted on a substrate, electrostrictive vibrations may propagate to the substrate, thereby causing so-called chattering noises.

Hence, a multilayer capacitor disclosed in Japanese Patent Application Laid-Open No. 2004-266110 is provided with metal terminals having inner connecting parts for clamping capacitor element body side faces formed with terminal electrodes, outer connecting parts for clamping capacitor element body side faces formed with no terminal electrodes, and intermediate parts for connecting the inner and outer connecting parts together. In the multilayer capacitor, the intermediate parts are made thinner than the inner connecting parts and adapted to flex so as to absorb electrostrictive vibrations.

SUMMARY OF THE INVENTION

As mentioned above, the absorption of electrostrictive vibrations by utilizing the flexure of metal terminals seems to be effective in preventing multilayer capacitors from causing chattering noises. It is therefore important to further ameliorate the structure of multilayer capacitors comprising such metal terminals, so as to improve their easiness to manufacture.

In order to achieve the task mentioned above, it is an object of the present invention to provide a multilayer capacitor which can efficiently prevent chattering noises from occurring in a simple structure.

For attaining the above-mentioned object, the present invention provides a multilayer capacitor comprising a capacitor element body formed by laminating a plurality of dielectric layers, a terminal electrode formed on a side face of the capacitor element body, and a metal terminal disposed about the capacitor element body; wherein the metal terminal has a substrate connecting surface to become a connecting end to a mounting substrate, a terminal connecting surface to become a connecting end to the terminal electrode, and a joint surface for joining the substrate connecting surface and terminal connecting surface to each other; and wherein the substrate connecting surface is arranged on a bottom face side of the capacitor element body, while at least one of the terminal connecting surface and joint surface has a first rising part rising from the substrate connecting surface by a height not exceeding that of the capacitor element body.

The metal terminal is disposed about the capacitor element body in this multilayer capacitor. Therefore, even when an electrostrictive vibration is generated in the multilayer capacitor under voltage application, the joint surface joining the substrate connecting surface and terminal connecting surface in the metal terminal can flex, so as to mitigate the electrostrictive vibration, thereby preventing chattering noises from occurring. Since at least one of the terminal connecting surface and joint surface has the rising part, the joint surface joins together the terminal connecting surface and substrate connecting surface that are positioned on different side faces of the capacitor element body, whereby a sufficient length can be secured in the joint surface. This can improve the efficiency of mitigating electrostrictive vibrations. Since the rising part is not higher than the capacitor element body, the metal terminal can easily be mounted to the capacitor element body.

Preferably, the joint surface extends longitudinally of the capacitor element body. This can more fully secure the length of the joint surface, thereby making it possible to further enhance the efficiency of mitigating electrostrictive vibrations.

Preferably, the substrate connecting part has a second rising part rising by a height not exceeding that of the capacitor element body while being separated from the first rising part. This makes it easier to see the exterior of fillets when connecting the multilayer capacitor to the mounting substrate with solder, for example.

Preferably, the terminal connecting surface has a capacitor element body supporting surface for supporting the bottom face of the capacitor element body, while the substrate supporting surface is positioned lower than the capacitor element body supporting surface, so as to yield a space between the substrate connecting surface and the bottom face of the capacitor element body. In this case, just mounting the capacitor element body on the capacitor element body supporting surface can easily align the capacitor element body and metal terminal with each other. Since the substrate connecting surface is positioned lower than the capacitor element body supporting surface, the capacitor element body is kept from coming into direct contact with the substrate connecting surface, and the terminal connecting surface is separated from the mounting substrate when the multilayer capacitor is mounted thereon, whereby chattering noises can further reliably be prevented from occurring.

Preferably, the height of each rising part is not more than half that of the capacitor element body. This can secure the easiness of mounting the metal terminal to the capacitor element body.

As in the foregoing, the present invention can efficiently prevent chattering noises from occurring in a simple structure.

BRIEF DESCRIPTION OF THE DRAWINGS

FIG. 3 is a view illustrating a procedure of forming metal terminals in the multilayer capacitor illustrated in FIG. 1;

FIG. 7 is a view illustrating a procedure of forming metal terminals in the multilayer capacitor illustrated in FIG. 6;

FIG. 10 is a view illustrating a procedure of forming metal terminals in the multilayer capacitor illustrated in FIG. 8;

FIG. 12 is a view illustrating a procedure of forming metal terminals in the multilayer capacitor illustrated in FIG. 11;

FIG. 14 is a view illustrating a procedure of forming metal terminals in the multilayer capacitor illustrated in FIG. 13.

DESCRIPTION OF THE PREFERRED EMBODIMENTS

In the following, preferred embodiments of the multilayer capacitor in accordance with the present invention will be explained in detail with reference to the drawings.

First Embodiment

Figure 1:
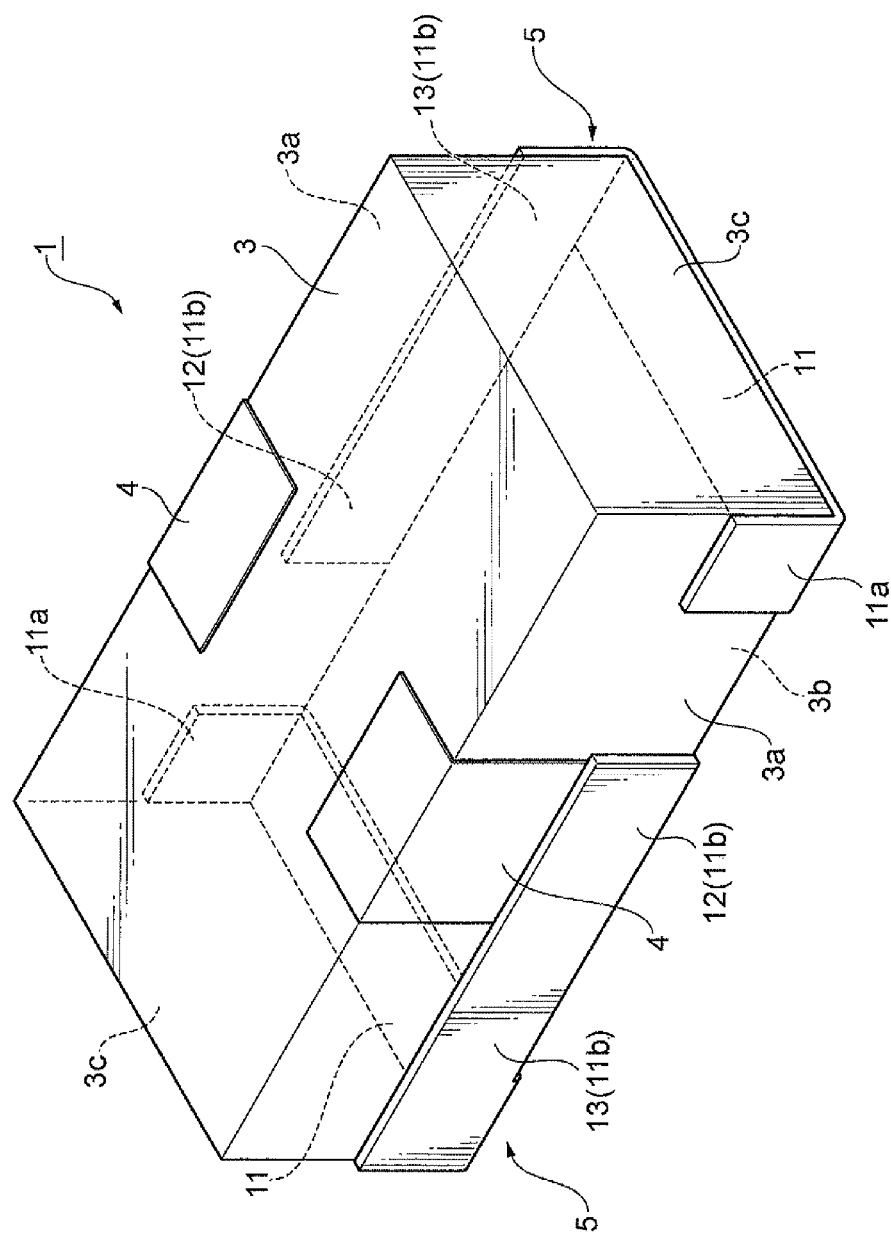
FIG. 1 is a perspective view illustrating the multilayer capacitor in accordance with a first embodiment of the present invention.
Figure 2:
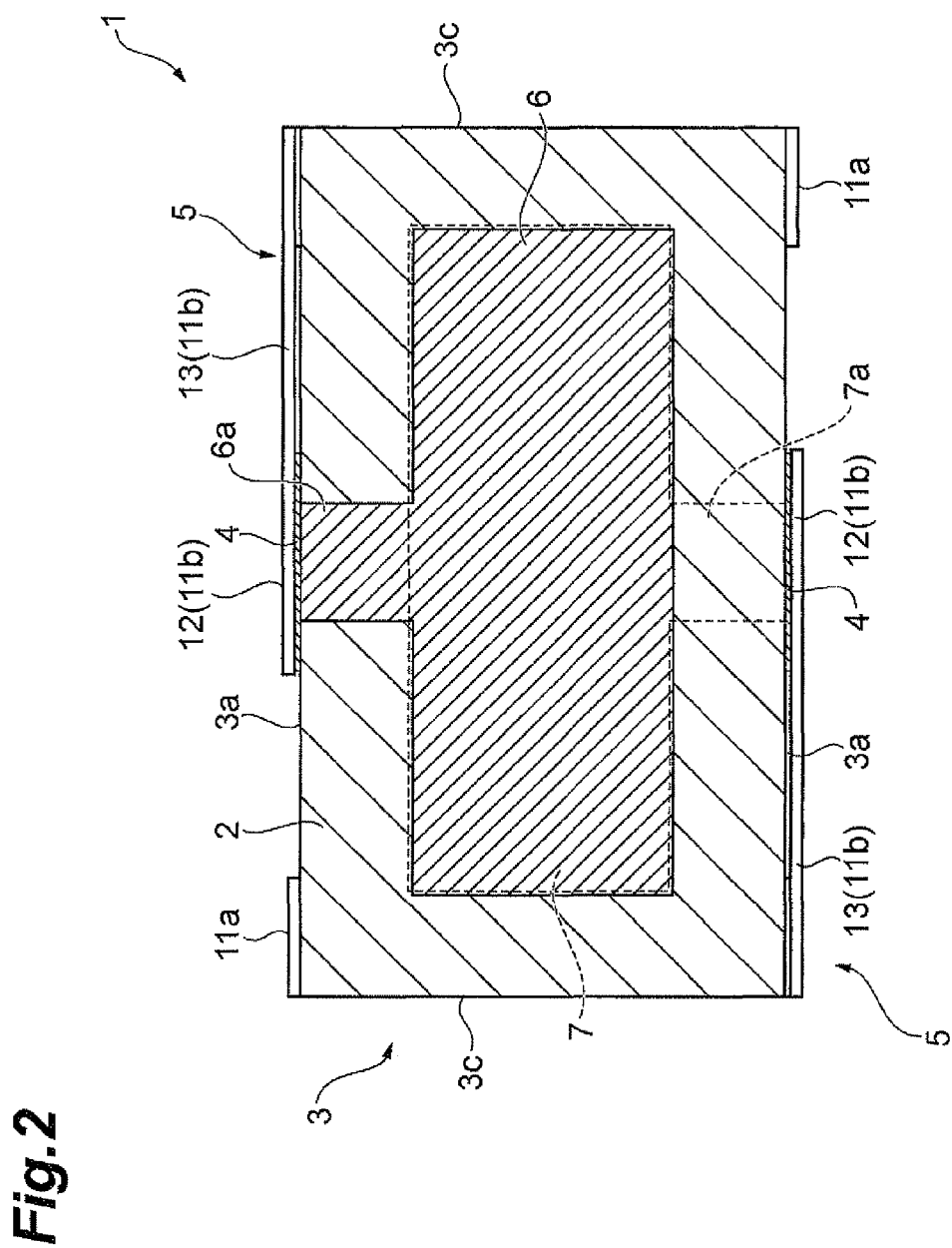
FIG. 2 is a transverse sectional view of a capacitor element body in the multilayer capacitor illustrated in FIG. 1.

FIG. 1 is a perspective view illustrating the multilayer capacitor in accordance with the first embodiment of the present invention. FIG. 2 is a transverse sectional view of a capacitor element body in the multilayer capacitor illustrated in FIG. 1.

As illustrated in FIG. 1, the multilayer capacitor 1, which is a multilayer ceramic capacitor of 2012 type (having a length of 2.0 mm, a width of 1.2 mm, and a height of 1.0 mm), for example, comprises a substantially rectangular parallelepiped capacitor element body 3 formed by laminating a plurality of dielectric layers 2 (see FIG. 2), a pair of terminal electrodes 4, 4 formed at substantially center portions of lateral side faces 3a, 3a of the capacitor element body 3, and a pair of metal terminals 5, 5 disposed about the capacitor element body 3.

The dielectric layers 2 constituting the capacitor element body 3 are formed by sintering a multilayer body of ceramic green sheets containing a dielectric ceramic based on $BaTiO_3$, $Ba(Ti, Zr)O_3$, or $(Ba, Ca)TiO_3$, for example. In the capacitor element body 3, the dielectric layers 2 are integrated to such an extent that their boundaries are invisible.

As illustrated in FIG. 2, a first inner electrode 6 and a second inner electrode 7 are disposed within the capacitor element body 3. For example, each of the first and second inner electrodes 6, 7 is made by forming a pattern of a conductive paste containing Ag onto a ceramic green sheet by printing or the like and sintering the pattern together with the ceramic green sheet.

The first and second inner electrodes 6, 7 are alternately arranged while holding therebetween the dielectric layer 2 corresponding to at least one green sheet layer in the laminating direction. A lead electrode 6a extending to one of the side faces 3a of the capacitor element body 3 is foamed at substantially the center of a widthwise edge portion of the first inner electrode 6 and connects the first inner electrode 6 and one terminal electrode 4 to each other. A lead electrode 7a extending to the other of the side faces 3a of the capacitor element body 3 is formed at substantially the center of a widthwise edge portion of the second inner electrode 7 and connects the second inner electrode 7 and the other terminal electrode 4 to each other.

A capacitor element body area held between the first and second inner electrodes 6, 7 is a part substantially generating a capacitance in the multilayer capacitor 1. This capacitor element body area is also an area generating a mechanical strain because of the electrostrictive effect. That is, when a voltage is applied between the first and second inner electrodes 6, 7, the capacitor element body area expands in the laminating direction of the capacitor element body 3 and shrinks in directions connecting the opposing side faces of the capacitor element body 3.

As mentioned above, the respective lead electrodes 6a, 7a of the first and second inner electrodes 6, 7 are directed opposite to each other, so that current flows are directed opposite to each other in the laminating direction between the respective capacity forming areas of the first and second inner electrodes 6, 7. Since the lead electrodes 6a, 7a are formed at substantially the centers of the respective widthwise edge portions of the first and second inner electrodes 6, 7, respective in-plane current flows in the first and second inner electrodes 6, 7 are directed opposite to each other through the positions of the lead electrodes 6a, 7a. Hence, magnetic fields caused by the currents partly cancel each other out, thereby lowering the ESL of the multilayer capacitor 1.

The terminal electrodes 4 are formed by applying and burning a conductive paste containing a conductive metal powder and glass frit onto the side faces 3a, 3a of the capacitor element body 3, for example. Plating layers may be formed on the surfaces of the burned terminal electrodes 4 when necessary. The conductive paste may be applied by printing, for example.

The metal terminals 5 will now be explained. Each metal terminal 5 has a thickness of 80 to 500 μm, for example, and comprises a substrate connecting surface 11 to become a connecting end to a mounting substrate (not depicted), a terminal connecting surface 12 to become a connecting end to the terminal electrode 4, and a joint surface 13 for joining the substrate connecting surface 11 and terminal connecting surface 12 together.

The substrate connecting surface 11 extends along a longitudinal edge portion of the bottom face 3b of the capacitor element body 3. The substrate connecting surface 11 is in contact with but not secured to the bottom face 3b of the capacitor element body 3. The leading end portion of the substrate connecting surface 11 bends substantially at right angles from the bottom face 3b of the capacitor element body 3 to the side face 3a, thereby forming a rising part 11a rising from the body part of the substrate connecting surface 11. The rising part 11a has a height which is about half that of the capacitor element body 3 and supports the capacitor element body 3.

The terminal connecting surface 12 and joint surface 13 form a rising part 11b rising from the body part of the substrate connecting surface 11 and extend in substantially the lower half area of the capacitor element body 3 on the side face 3a of the capacitor element body 3. The terminal connecting surface 12 is bonded to the lower half area of the terminal electrode 4 with high-temperature solder or a conductive adhesive, for example. The joint surface 13 extends from the terminal connecting surface 12 to the longitudinal side face 3c of the capacitor element body 3, so as to connect with the base end portion of the substrate connecting surface 11 near a corner portion of the capacitor element body 3.

The terminal connecting surface 12 is separated by predetermined distances from the rising parts 11a, 11b of the substrate connecting surface 11 in the other metal terminal 5. The joint surface 13 is in contact with but not secured to the side face 3a of the capacitor element body 3. Therefore, when a mechanical strain occurs in the side face 3a of the capacitor element body 3 because of the electrostrictive effect, the joint surface 13 flexes along with the strain.

Thus constructed metal terminals 5 can be formed by pressing lead frames as illustrated in FIG. 3, for example. First, as illustrated in FIG. 3(a), substantially L-shaped lead frames 21, 21 each having a substrate connecting surface equivalent part 22, a terminal connecting surface equivalent part 23, and a joint surface equivalent part 24 are prepared. The lead frames 21, 21 are formed by punching a metal sheet, for example.

Subsequently, predetermined portions (indicated by broken lines in FIG. 3(a)) of each lead frame 21 are bent at once by a predetermined jig, so as to raise the terminal connecting surface equivalent part 23, the joint surface equivalent part 24, and the leading end portion 22a of the substrate connecting surface equivalent part 22 substantially at right angles from the substrate connecting surface equivalent part 22. This forms the substrate connecting surface 11, the terminal connecting surface 12, the joint surface 13, and the rising part 11a of the substrate connecting surface 11, thereby completing the metal terminal 5 as illustrated in FIG. 3(b).

For connecting the terminal connecting surface 12 and terminal electrode 4 to each other, it will be sufficient if high-temperature solder or a conductive adhesive is applied to the terminal connecting surface 12 and then the bottom face 3b of the capacitor element body 3 is mounted on the front side of the substrate connecting surface 11 while aligning the terminal connecting surface 12 and terminal electrode 4 with each other. For connecting the multilayer capacitor 1 and a mounting substrate to each other, it will be sufficient if a land electrode of the mounting substrate and the substrate connecting surface 11 are bonded to each other with a reflow of cream solder, for example.

As explained in the foregoing, the metal terminals 5, 5 are disposed about the capacitor element body 3 in the multilayer capacitor 1. Even when an electrostrictive vibration is generated in the multilayer capacitor 1 upon voltage application, the joint surface 13 joining the substrate connecting surface 11 and terminal connecting surface 12 together in each metal terminal 5 can flex, so as to mitigate the electrostrictive vibration, thereby preventing chattering noises from occurring.

In the multilayer capacitor 1, the terminal connecting surface 12 and joint surface 13 form the rising part 11b. Therefore, the joint surface 13 joins together the terminal connecting surface 12 and substrate connecting surface 11 that are positioned on different side faces of the capacitor element body 3, whereby a sufficient length can be secured in the joint surface 13. This improves the efficiency of mitigating electrostrictive vibrations. In the multilayer capacitor 1, the rising parts 11a, 11b have a height which is about half that of the capacitor element body 3. Therefore, a simple procedure of just mounting the capacitor element body 3 onto the front side of the substrate connecting surface 11 while aligning the terminal connecting surface 12 and terminal electrode 4 with each other can easily attach the metal terminal 5 to the capacitor element body 3.

Since no areas of the metal terminal 5 overlap each other as seen in the height direction of the capacitor element body 3, while rising parts 11a, 11b are separated from each other, the metal terminal 5 can easily be made by a single pressing operation of the lead frame 21. Hence, the manufacturing procedure is simple, while the cost can be cut down.

Second Embodiment

Figure 4:
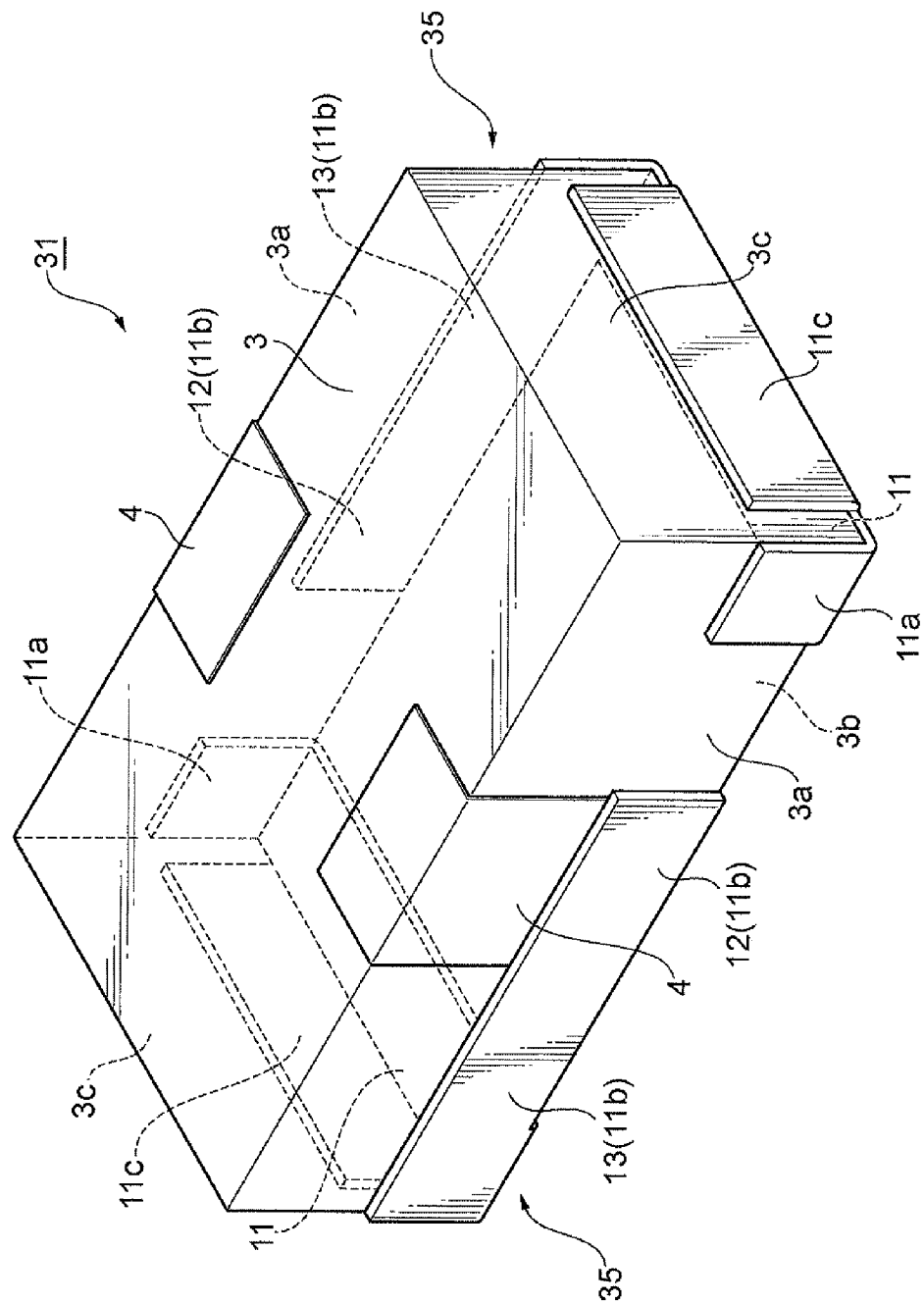
FIG. 4 is a perspective view illustrating the multilayer capacitor in accordance with a second embodiment of the present invention.

The second embodiment of the present invention will now be explained. FIG. 4 is a perspective view illustrating the multilayer capacitor in accordance with the second embodiment of the present invention. As illustrated in FIG. 4, the multilayer capacitor 31 in accordance with the second embodiment differs from that of the first embodiment in that a rising part 11c extending along the side face 3c of the capacitor element body 3 is additionally formed on the substrate connecting surface 11 of each metal terminal 35.

That is, in the multilayer capacitor 31, the rising part 11c different from the rising part 11a is disposed on the substrate connecting surface 11 of each metal terminal 35 and extends in substantially the lower half area of the capacitor element body 3 on the side face 3c of the capacitor element body 3. The height of the rising part 11c is about half that of the capacitor element body 3. The rising part 11c is slightly shorter than the width of the capacitor element body 4 and thus is separated from the rising parts 11a, 11b extending along the side faces 3a.

Figure 5:
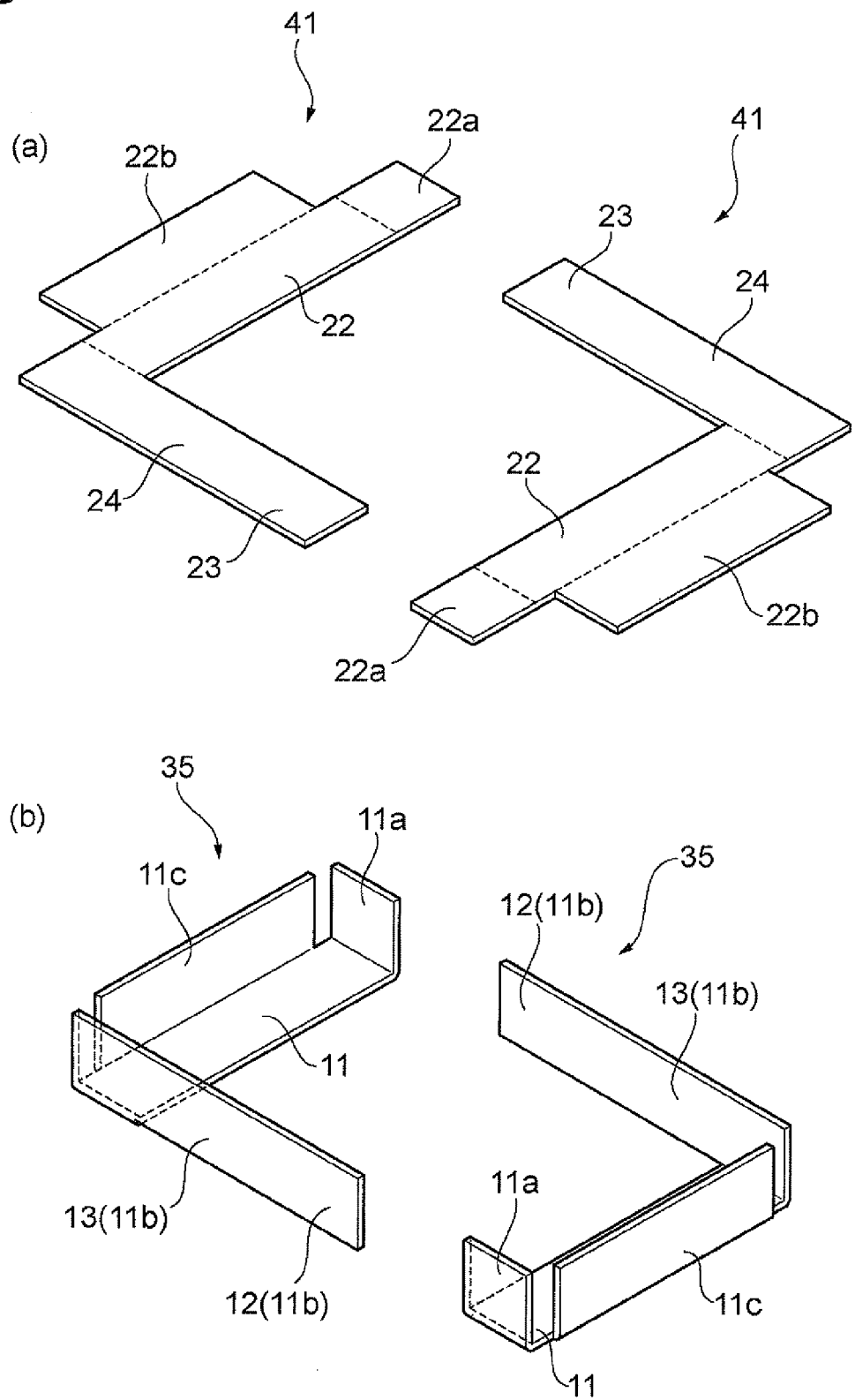
FIG. 5 is a view illustrating a procedure of forming metal terminals in the multilayer capacitor illustrated in FIG. 4.

Thus constructed metal terminals 35 can be formed by pressing lead frames as illustrated in FIG. 5, for example. First, as illustrated in FIG. 5(a), substantially L-shaped lead frames 41, 41 each having a substrate connecting surface equivalent part 22, a terminal connecting surface equivalent part 23, and a joint surface equivalent part 24 are prepared. The lead frames 41, 41 are formed by punching a metal sheet, for example. In each of the lead frames 41, 41, the substrate connecting surface equivalent part 22 is formed with a rectangular protrusion 22b corresponding to the rising part 11c.

Subsequently, predetermined portions (indicated by broken lines in FIG. 5(a)) of each lead frame 41 are bent at once by a predetermined jig, so as to raise the terminal connecting surface equivalent part 23, the joint surface equivalent part 24, the leading end portion 22a of the substrate connecting surface equivalent part 22, and the protrusion 22b substantially at right angles from the substrate connecting surface equivalent part 22. This forms the substrate connecting surface 11, the terminal connecting surface 12, the joint surface 13, and the rising parts 11a, 11c of the substrate connecting surface 11, thereby completing the metal terminal 35 as illustrated in FIG. 5(b).

This multilayer capacitor 31 can yield advantageous effects similar to those of the first embodiment. Since the substrate connecting surface 11 is provided with the rising part 11c, the exterior of fillets is easier to see when connecting the multilayer capacitor 31 to the mounting substrate with solder. Hence, the bonding strength between the multilayer capacitor 31 and mounting substrate can be secured by observing the state of fillets.

Third Embodiment

Figure 6:
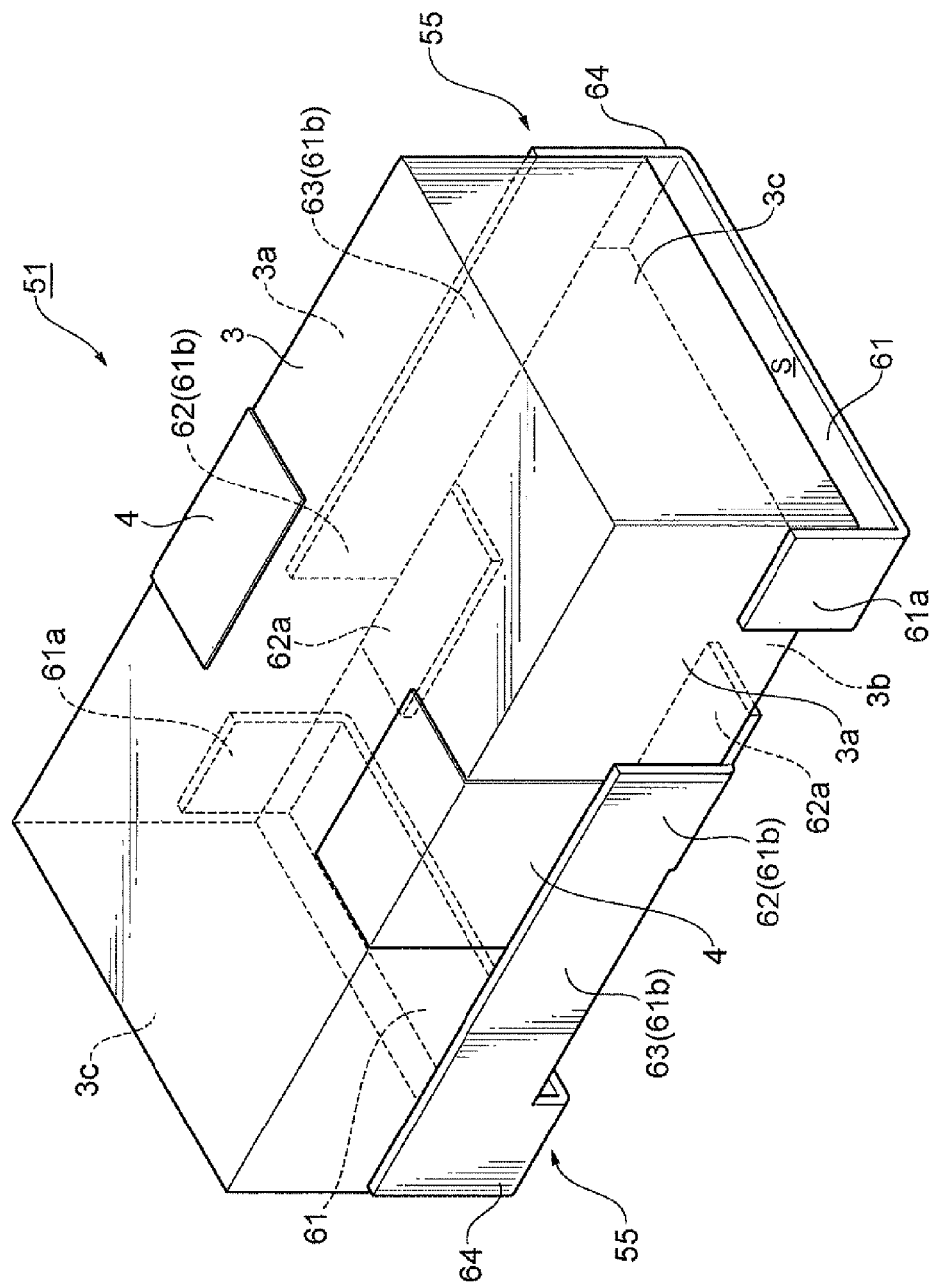
FIG. 6 is a perspective view illustrating the multilayer capacitor in accordance with a third embodiment of the present invention.

The third embodiment of the present invention will now be explained. FIG. 6 is a perspective view illustrating the multilayer capacitor in accordance with the third embodiment of the present invention. As illustrated in FIG. 6, the multilayer capacitor 51 in accordance with the third embodiment is the same as that of the first embodiment in that a terminal connecting surface 62 and a joint surface 63 in each metal terminal 55 form a rising part 61b with respect to a substrate connecting surface 61, but differs therefrom in that the terminal connecting surface 62 is formed with a capacitor element body supporting surface 62a for supporting the bottom face 3b of the capacitor element body 3 while the substrate connecting surface 61 is positioned lower than the capacitor element body supporting surface 62a.

That is, in the multilayer capacitor 51, the terminal connecting surface 62 of the metal terminal 55 is provided with the capacitor element body supporting surface 62a, which bends substantially at right angles from the lower end of the terminal connecting surface 62 so as to project to the bottom face 3b of the capacitor element body 3, thereby supporting the capacitor element body 3. A part of the capacitor element body supporting surface 62a projects to a side opposite to the substrate connecting surface 61, whereby the capacitor element body 3 can be supported more reliably.

In the multilayer capacitor 51, a spacer surface 64 extending in the height direction of the capacitor element body is interposed at a connecting portion between the joint surface 63 and substrate connecting surface 61 in the metal terminal 55, so that the substrate connecting surface 61 is positioned lower than the capacitor element body supporting surface 62a by the height of the spacer surface 64. As a consequence, a space S corresponding to the height of the spacer surface 64 exists between the substrate connecting surface 61 and the bottom face 3b of the capacitor element body 3.

Thus constructed metal terminals 55 can be formed by pressing lead frames as illustrated in FIG. 7, for example. First, as illustrated in FIG. 7(a), substantially L-shaped lead frames 71, 71 each having a substrate connecting surface equivalent part 22, a terminal connecting surface equivalent part 23, and a joint surface equivalent part 24 are prepared. The lead frames 71, 71 are formed by punching a metal sheet, for example. In each of the lead frames 71, 71, the terminal connecting surface equivalent part 23 is formed with a rectangular protrusion 23a corresponding to the capacitor element body supporting surface 62a.

Subsequently, predetermined portions (indicated by broken lines in FIG. 7(a)) of each lead frame 71 are bent at once by a predetermined jig, so as to raise the terminal connecting surface equivalent part 23, the joint surface equivalent part 24, and the leading end portion 22a of the substrate connecting surface equivalent part 22 substantially at right angles from the substrate connecting surface equivalent part 22 and protrusion 23a. This forms the substrate connecting surface 61, the terminal connecting surface 62, the joint surface 63, the capacitor element body supporting surface 62a, and the rising part 61a of the substrate connecting surface 61 as illustrated in FIG. 7(b).

The spacer surface 64 can be formed simultaneously with the above-mentioned surfaces by shifting the bend line between the substrate connecting surface equivalent part 22 and joint surface equivalent part 24 toward the center of the substrate connecting surface equivalent part 22 with respect to the bend line between the terminal connecting surface equivalent part 23 and protrusion 23a. The height of the spacer surface 64 is adjustable by the amount of shift of the former bend line.

This multilayer capacitor 51 can also yield advantageous effects similar to those of the first embodiment. In the multilayer capacitor 51, while the terminal connecting surface 62 has the capacitor element body supporting surface 62a for holding the bottom face 3b of the capacitor element body 3, the substrate connecting surface 61 is positioned lower than the capacitor element body supporting surface 62a, whereby the space S exists between the substrate connecting surface 61 and the bottom face 3b of the capacitor element body 3. Such a structure makes it easier to align the capacitor element body 3 and the metal terminal 55 with each other by just mounting the capacitor element body 3 onto the capacitor element body supporting surface 62a. The capacitor element body 3 is not in direct contact with the substrate connecting surface 61, while the terminal connecting surface 62 is separated from the mounting substrate when the multilayer capacitor 51 is mounted thereto, whereby chattering noises can further reliably be prevented from occurring.

Fourth Embodiment

Figure 8:
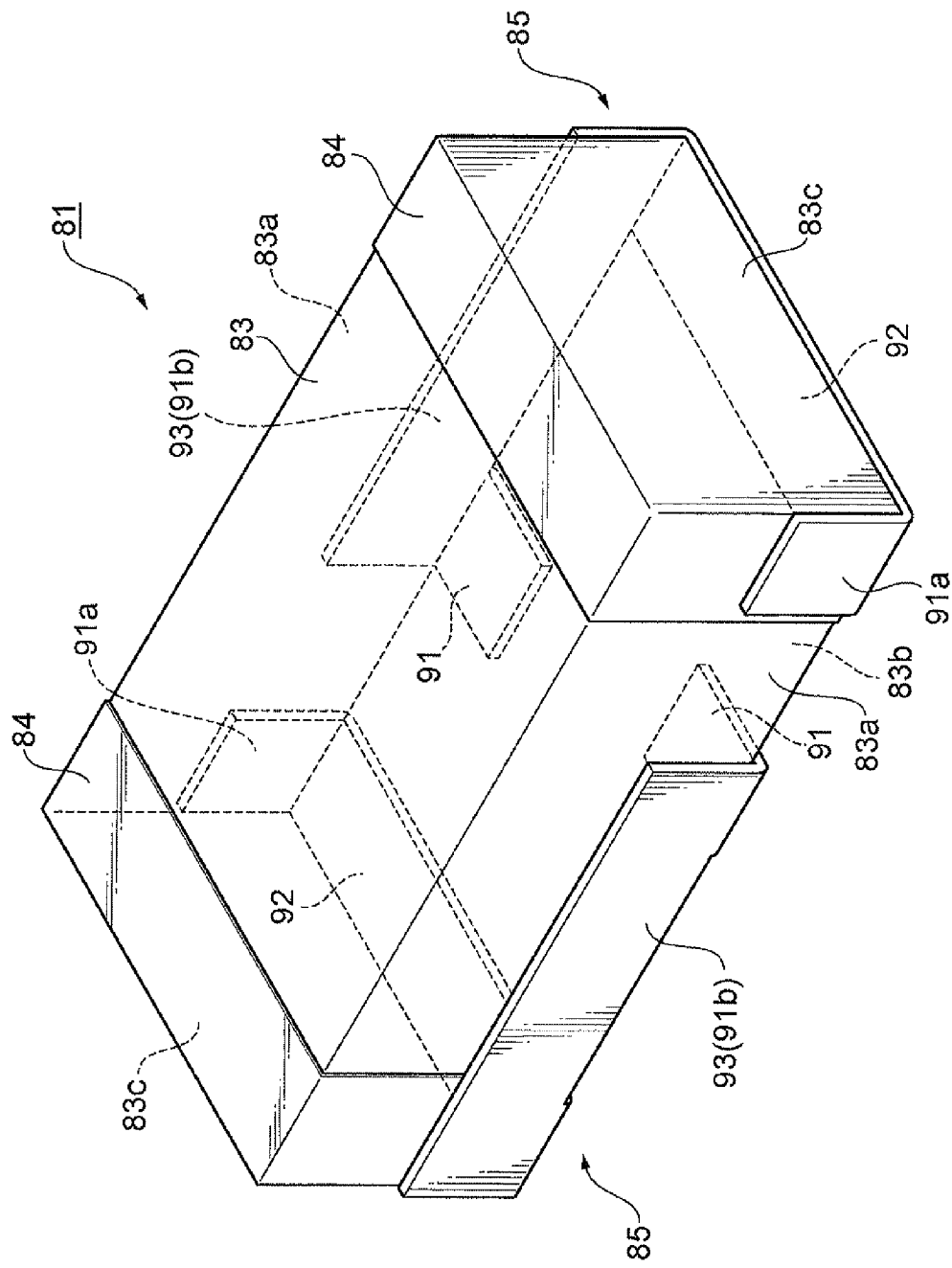
FIG. 8 is a perspective view illustrating the multilayer capacitor in accordance with a fourth embodiment of the present invention.

The fourth embodiment of the present invention will now be explained. FIG. 8 is a perspective view illustrating the multilayer capacitor in accordance with the fourth embodiment of the present invention. As illustrated in FIG. 8, terminal electrodes 84 are formed such as to cover longitudinal side faces 83c of a capacitor element body 83, which makes the multilayer capacitor 81 in accordance with the fourth embodiment different from that of the first embodiment in which the terminal electrodes 4 are formed on the lateral side faces 3a of the capacitor element body 3.

Figure 9:
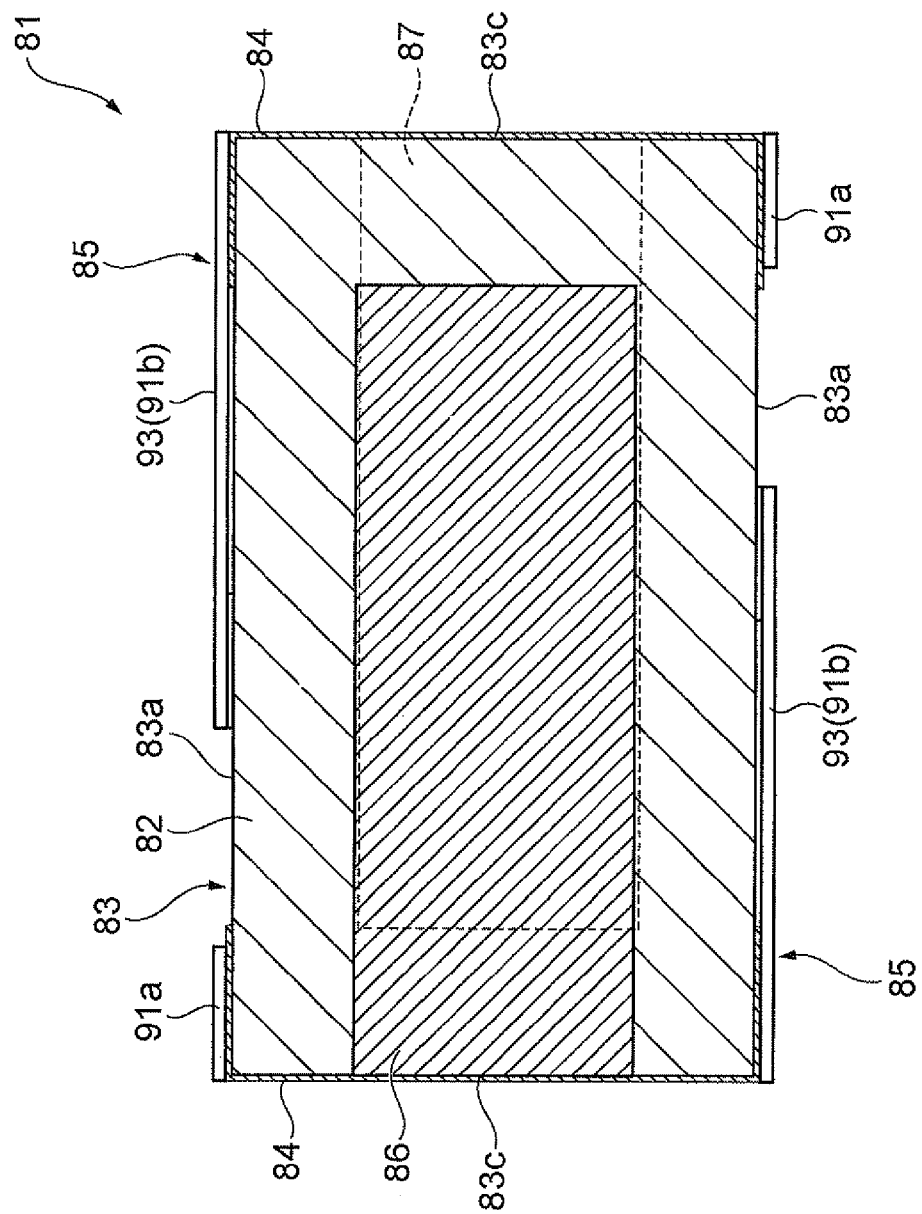
FIG. 9 is a transverse sectional view of a capacitor element body in the multilayer capacitor illustrated in FIG. 8.

In this multilayer capacitor 81, as illustrated in FIG. 9, a first inner electrode 86 and a second inner electrode 87 are alternately arranged while holding therebetween a dielectric layer 82 corresponding to at least one green sheet layer in the laminating direction. An end portion of the first inner electrode 86 extends to one of the longitudinal side faces 83c in the capacitor element body 83, while an end portion of the second inner electrode 87 extends to the other of the longitudinal side faces 83c in the capacitor element body 83.

The structural difference in the terminal electrodes 84 makes the arrangement of a substrate connecting surface 91, a terminal connecting surface 92, and a joint surface 93 in each metal terminal 85 different from that in the first embodiment. That is, in the metal terminal 85 of the multilayer capacitor 81, as illustrated in FIG. 8, the substrate connecting surface 91 is positioned at substantially the center of a widthwise edge portion of the bottom face 83b of the capacitor element body 83, while the terminal connecting surface 92 extends along a longitudinal edge portion of the bottom face 83b of the capacitor element body 83.

The joint surface 93 forms a rising part 91b rising from the substrate connecting surface and extends in substantially the lower half area of the capacitor element body 83 on the side face 83a of the capacitor element body 83. The leading end portion of the terminal connecting surface 92 bends substantially at right angles from the bottom face 83b of the capacitor element body 83 to the side face 83a, thereby forming a rising part 91a rising from the body part of the terminal connecting surface 92.

Thus constructed metal terminals 85 can be formed by pressing lead frames as illustrated in FIG. 10, for example. First, as illustrated in FIG. 10(a), substantially L-shaped lead frames 101, 101 each having a substrate connecting surface equivalent part 102, a terminal connecting surface equivalent part 103, and a joint surface equivalent part 104 are prepared. The lead frames 101, 101 are formed by punching a metal sheet, for example.

Subsequently, predetermined portions (indicated by broken lines in FIG. 10(a)) of each lead frame 101 are bent at once by a predetermined jig, so as to raise the joint surface equivalent part 104 and the leading end portion 103a of the terminal connecting surface equivalent part 103 substantially at right angles from the terminal connecting surface equivalent part 103 and substrate connecting surface equivalent part 102. This forms the substrate connecting surface 91, the terminal connecting surface 92, the joint surface 93, and the rising part 91a of the terminal connecting surface 92, thereby completing the metal terminal 85 as illustrated in FIG. 10(b). This multilayer capacitor 81 can also yield advantageous effects similar to those of the first embodiment.

Figure 11:
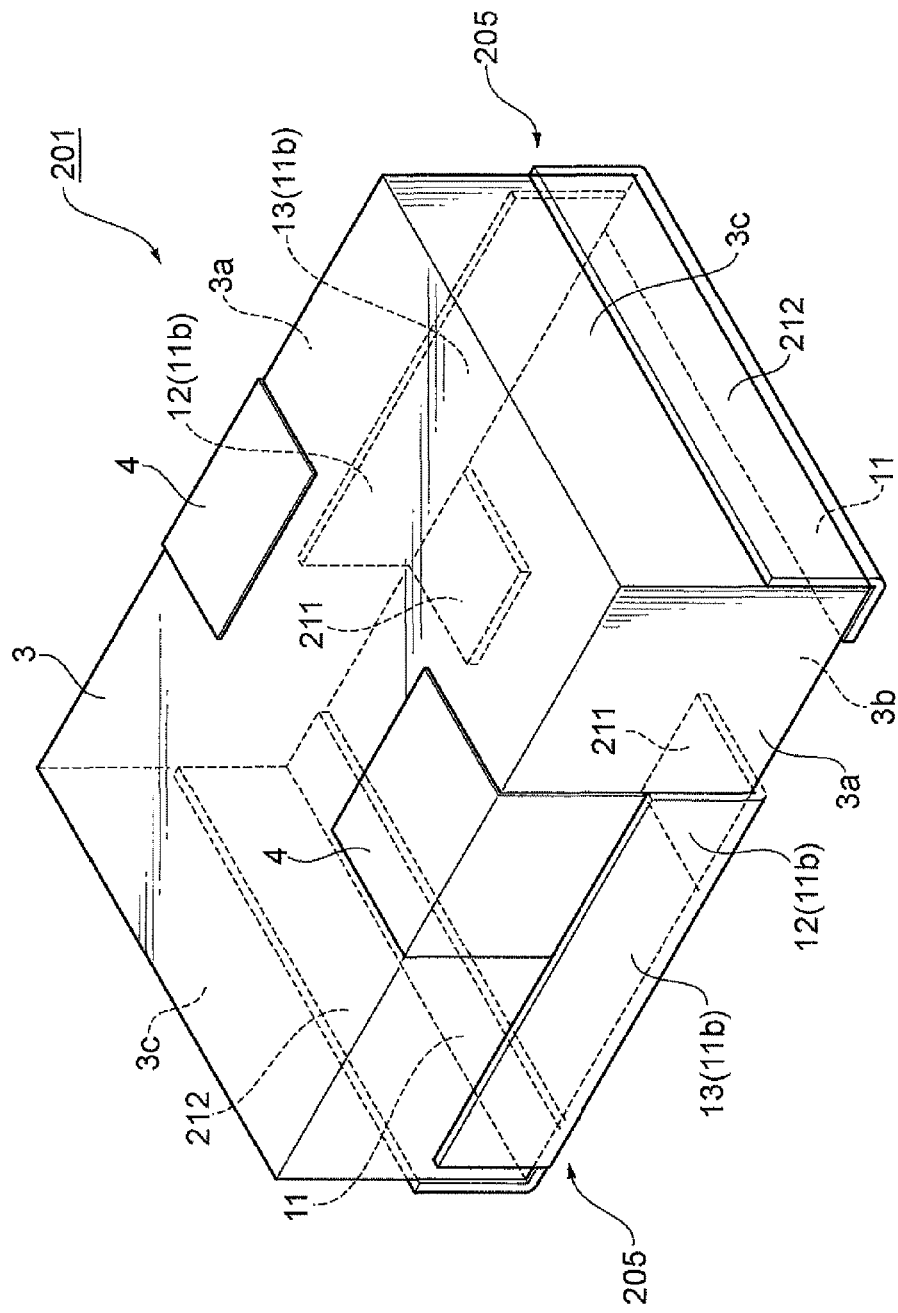
FIG. 11 is a perspective view illustrating the multilayer capacitor in accordance with a modified example of the present invention.

The present invention is not limited to the above-mentioned embodiments. As a modified example of the first and second embodiments, a capacitor element body supporting surface 211 may be formed on the terminal connecting surface 12 of each metal terminal 205 as in a multilayer capacitor 201 illustrated in FIG. 11. In the metal terminal 205 of the multilayer capacitor 201, the capacitor element body supporting surface 211 bends substantially at right angles from the lower end of the terminal connecting surface 12, so as to project to the bottom face 3b of the capacitor element body 3, thereby supporting the capacitor element body 3.

The terminal connecting surface 12 is formed with a rising part 212, in place of the rising part 11a at the leading end, extending along the longitudinal side face 3c of the capacitor element body 3 by the width of the capacitor element body 3. The joint surface 13 extends longitudinally of the capacitor element body 3 from the terminal connecting surface 12 so as to connect with the base end portion of the substrate connecting surface 11 at a corner portion of the capacitor element body 3 but falls short of the longitudinal side face 3c of the capacitor element body 3, thereby being separated from the rising part 212 of the substrate connecting surface 11.

Thus constructed metal terminals 205 can be formed by pressing lead frames as illustrated in FIG. 12, for example. First, as illustrated in FIG. 12(a), substantially L-shaped lead frames 221, 221 each having a substrate connecting surface equivalent part 222, a terminal connecting surface equivalent part 223, and a joint surface equivalent part 224 are prepared. The lead frames 221, 221 are formed by punching a metal sheet, for example. In each of the lead frames 221, 221, the terminal connecting surface equivalent part 223 is formed with a rectangular protrusion 223a corresponding to the capacitor element body supporting surface 211. The substrate connecting surface equivalent part 222 has a rising part equivalent part 222a and is wider than the terminal connecting surface equivalent part 223 and the joint surface equivalent part 224.

Subsequently, predetermined portions (indicated by broken lines in FIG. 12(a)) of each lead frame 221 are bent at once by a predetermined jig, so as to raise the terminal connecting surface equivalent part 223, the joint surface equivalent part 224, and the rising part equivalent part 222a substantially at right angles from the substrate connecting surface equivalent part 222 and protrusion 223a. This forms the substrate connecting surface 11, the terminal connecting surface 12, the joint surface 13, the capacitor element body supporting surface 211, and the rising part 212 of the substrate connecting surface 11, thereby completing the metal terminal 205 as illustrated in FIG. 12(b).

Figure 13:
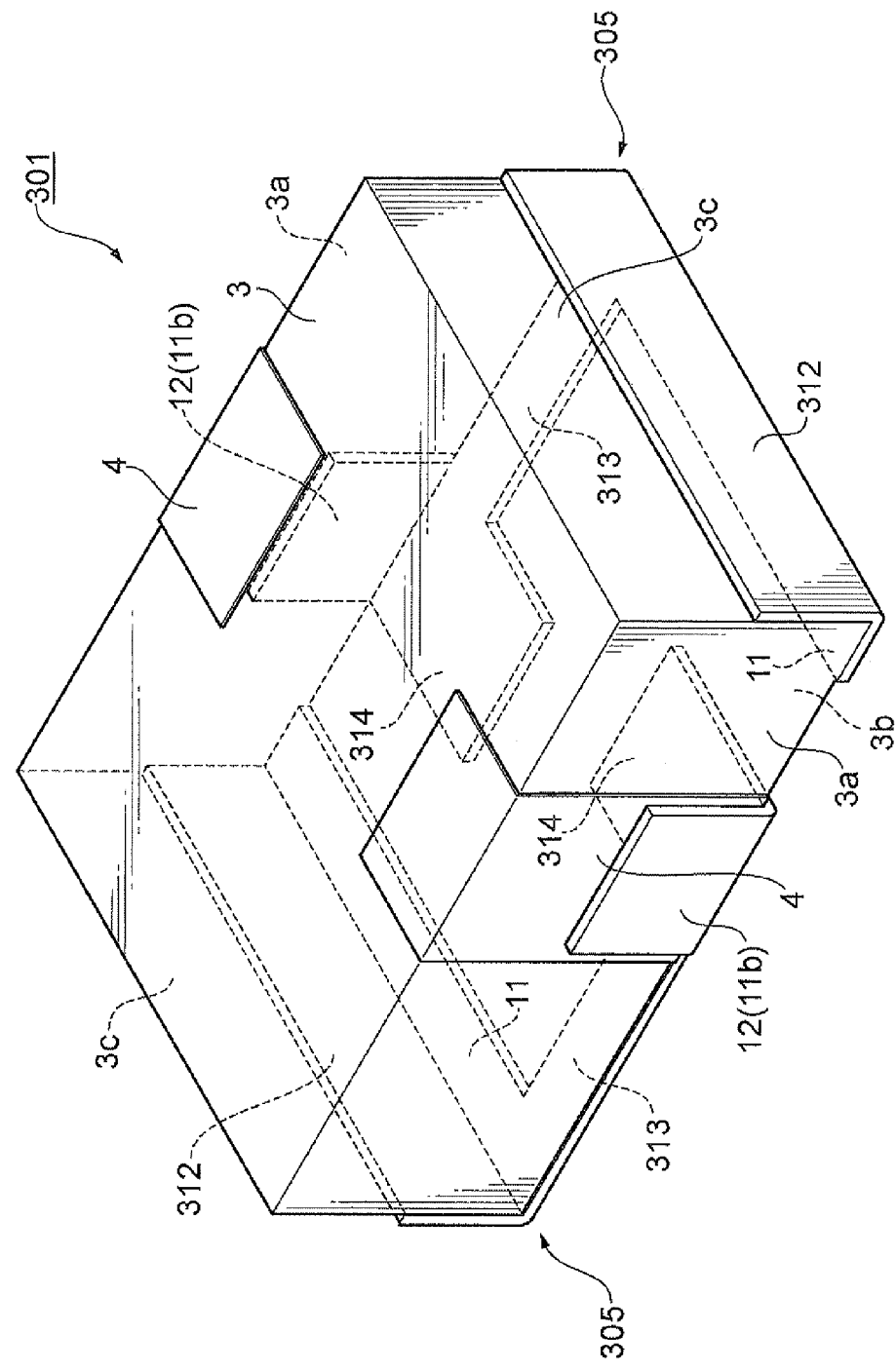
FIG. 13 is a perspective view illustrating the multilayer capacitor in accordance with another modified example of the present invention.

While the joint surface 13 of the metal terminal 5 extends along the side face 3a of the capacitor element body 3 in the multilayer capacitor 1 in accordance with the first embodiment, a joint surface 313 of a metal terminal 305 may extend along the bottom face 3b of the capacitor element body 3 as in the multilayer capacitor 301 illustrated in FIG. 13, for example. In the metal terminal 305 of the multilayer capacitor 301, the joint surface 313 extends along a widthwise edge portion of the bottom face 3b in the capacitor element body 3, thereby joining the substrate connecting surface 11 to a capacitor element body supporting surface 314 extending from the terminal connecting surface 12 to the bottom face 3b of the capacitor element body 3. As in FIG. 11, the substrate connecting surface 11 is provided with a rising part 312 extending by the width of the capacitor element body 3.

Thus constructed metal terminals 305 can be formed by pressing lead frames as illustrated in FIG. 14, for example. First, as illustrated in FIG. 14(a), substantially L-shaped lead frames 321, 321 each having a substrate connecting surface equivalent part 322, a terminal connecting surface equivalent part 323, and a joint surface equivalent part 324 are prepared. The lead frames 321, 321 are formed by punching a metal sheet, for example. In each of the lead frames 321, 321, the terminal connecting surface equivalent part 323 is formed with a rectangular protrusion 323a corresponding to the capacitor element body supporting surface 314. The substrate connecting surface corresponding part 322 has a rising part equivalent part 322a and is wider than the terminal connecting surface equivalent part 323 and the joint surface equivalent part 324.

Subsequently, predetermined portions (indicated by broken lines in FIG. 14(a)) of each lead frame 321 are bent at once by a predetermined jig, so as to raise the terminal connecting surface equivalent part 323 and the rising part equivalent part 322a substantially at right angles from the substrate connecting surface equivalent part 322 and protrusion 323a. This forms the substrate connecting surface 11, the terminal connecting surface 12, the joint surface 313, the capacitor element body supporting surface 314, and the rising part 312 of the substrate connecting surface 11, thereby completing the metal terminal 305 as illustrated in FIG. 14(b).

What is claimed is:

1. A multilayer capacitor comprising a capacitor element body formed by laminating a plurality of dielectric layers in a height direction of the capacitor element body, a terminal electrode formed on a side face of the capacitor element body, the side face being substantially parallel to the height direction, and a metal terminal disposed about the capacitor element body;

wherein the metal terminal has a substrate connecting surface to become a connecting end to a mounting substrate, a terminal connecting surface to become a connecting end to the terminal electrode, and a joint surface for joining the substrate connecting surface and terminal connecting surface to each other and any areas thereof do not overlap each other as seen from the height direction, and wherein the substrate connecting surface is arranged on a bottom face side of the capacitor element body, the bottom face side being substantially perpendicular to the height direction, while each of the terminal connecting surface and joint surface has a first rising part rising from the substrate connecting surface by a height not exceeding that of the capacitor element body by bending only to one direction with respect to the substrate connecting surface, along the height direction of the capacitor element body.

2. A multilayer capacitor according to claim 1, wherein the joint surface extends longitudinally of the capacitor element body.

3. A multilayer capacitor according to claim 1, wherein the substrate connecting surface has a second rising part rising from the substrate connecting surface by a height not exceeding that of the capacitor element body while being separated from the first rising part.

4. A multilayer capacitor according to claim 1, wherein the terminal connecting surface has a capacitor element body supporting surface for supporting the bottom face of the capacitor element body, while the substrate connecting surface is positioned lower than the capacitor element body supporting surface, so as to yield a space between the substrate connecting surface and the bottom face of the capacitor element body.

5. A multilayer capacitor according to claim 1, wherein the height of each first rising part is not more than half that of the capacitor element body.

6. A multilayer capacitor according to claim 1, wherein the substrate connecting surface is arranged beside a longitudinal end face of the capacitor element body;

wherein the substrate connecting surface has a second rising part rising from the substrate connecting surface by a height not exceeding that of the capacitor element body by bending only to one direction with respect to the substrate connecting surface, along the height direction of the capacitor element body; and wherein the first rising part and the second rising part come into contact with side faces of the capacitor element body respectively while being separated from each other.

* * * * *